(12) United States Patent
Bouwers et al.

(10) Patent No.: US 7,819,348 B2
(45) Date of Patent: Oct. 26, 2010

(54) PIVOTING/TELESCOPING WINCH BOOM FOR A BRUSH CHIPPER AND METHOD OF USING SAME

(75) Inventors: John T. B. Bouwers, Pella, IA (US); James L. O'Halloran, Pella, IA (US); Scott A. Rempe, Pella, IA (US)

(73) Assignee: Vermeer Manufacturing Company, Pella, IA (US)

( * ) Notice: Subject to any disclaimer, the term of this patent is extended or adjusted under 35 U.S.C. 154(b) by 284 days.

(21) Appl. No.: 11/873,223

(22) Filed: Oct. 16, 2007

(65) Prior Publication Data
US 2009/0095828 A1 Apr. 16, 2009

(51) Int. Cl.
*B02C 19/00* (2006.01)
(52) U.S. Cl. .................. 241/28; 241/92; 241/101.76
(58) Field of Classification Search .............. 241/92, 241/101.76, 101.763, 101.2, 28; 144/176, 144/335; 212/347–349; 254/333
See application file for complete search history.

(56) References Cited

U.S. PATENT DOCUMENTS

| | | | |
|---|---|---|---|
| 3,141,654 A * | 7/1964 | Bergerson et al. ........... 254/326 |
| 4,805,676 A | 2/1989 | Aikins |
| RE33,233 E | 6/1990 | Freeman |
| 5,010,933 A | 4/1991 | Doyle |
| 5,088,532 A | 2/1992 | Eggers |
| 6,138,932 A | 10/2000 | Moore |
| 6,446,889 B1 | 9/2002 | Moore |
| 7,011,258 B2 | 3/2006 | O'Halloran |
| 7,040,558 B2 | 5/2006 | Stelter |
| 7,044,409 B2 | 5/2006 | Stelter |
| 2006/0196981 A1 | 9/2006 | Stelter |
| 2007/0001038 A1 | 1/2007 | Bouwers |
| 2007/0014653 A1 * | 1/2007 | Glenn et al. ................. 414/467 |
| 2007/0034295 A1 | 2/2007 | Chapman |
| 2007/0104560 A1 | 5/2007 | Hall |

* cited by examiner

*Primary Examiner*—Mark Rosenbaum
(74) *Attorney, Agent, or Firm*—Sturm & Fix LLP (57) ABSTRACT

A brush chipper is disclosed having a pivoting and/or reciprocating winch for improving the efficiency of the winch.

20 Claims, 14 Drawing Sheets

Fig. 11

PIVOTING/TELESCOPING WINCH BOOM FOR A BRUSH CHIPPER AND METHOD OF USING SAME

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO MICROFICHE APPENDIX

Not Applicable.

BACKGROUND OF THE INVENTION

1. Field of the Invention

The present invention relates generally to a winch boom for a brush chipper and more particularly to a pivoting/telescoping winch boom for a brush chipper.

2. Background Art

Sometimes small branches on a larger limb can catch on a fixed winch as the larger limb is fed into the brush chipper. At other times, a fixed winch is in the way during routine maintenance of a feed table on a brush chipper. For instance, a log lying in a ditch to the side of the machine may need to be approached from a steep angle which is not possible with a fixed winch.

For lighter materials such as small branches, previous fixed-boom models had a problem with the branches not lifting up to the feed table like heavier logs do.

Accordingly, there is a need for a winch for brush chippers to overcome the aforementioned problems.

SUMMARY OF THE INVENTION

The present invention relates to a brush chipper having a pivoting and or reciprocating winch. Pivoting the winch up gets it out of the way, especially of small branches attached to larger limbs and logs being fed into the feed rollers. This prevents the rope from being snagged and allows less restricted feeding.

Earlier prior art fixed winches would be considered the boom-down position. The boom-up position allows for easier maintenance work. When a maintenance worker may have to work from the feed table, the boom is entirely out of the way.

With the pivoting winch, lighter material can be dragged to the machine in the boom-down position and then can be quickly and easily lifted to the feed table using the pivoting action. Greater locating possibilities are allowed with the pivoting winch. The pivoting boom could be set in the boom-up position while the log was attached to the rope to the side of the machine.

The boom lift cylinder on the pivoting winch boom senses the load on the boom and automatically adjusts itself to a lower position if the load reaches levels which are too great for the cylinder. A heavy log could be attached with the boom up and the boom would automatically adjust itself down as it pulls the log in.

Another embodiment of the pivoting winch boom which has been considered is that of a telescoping function. This would include another tube inside of the boom which could be extended by a hydraulic cylinder to extend the boom pulley to a greater distance from the machine. This embodiment would allow further location possibilities and greater ease of manipulating the material to the ground.

In an alternative embodiment in which the pivot point would be moved to a position behind the winch and closer to the ground, a longer boom would enable it to reach greater distances thereby allowing the boom to be used to carry the log for a greater distance. The boom would also be able to pivot down closer to the log possibly allowing easier choking and may eliminate the occasional inconvenience of re-choking the log during retrieval. A fixed winch, because of the upward angle chosen for most purposes, sometimes requires additional re-choking of the attachment to the log.

BRIEF DESCRIPTION OF THE DRAWINGS

FIG. 1 is a side elevation of a first preferred embodiment and demonstrates the brush chipper machine with pivoting winch boom attached at the rear of the machine and mounted atop the in-feed chute with boom cylinder extended and the boom at its maximum up position, with the boom pivot located behind the winch and with a winch line hooked over an interlock control;

DETAILED DESCRIPTION OF THE INVENTION

Figure 1A:
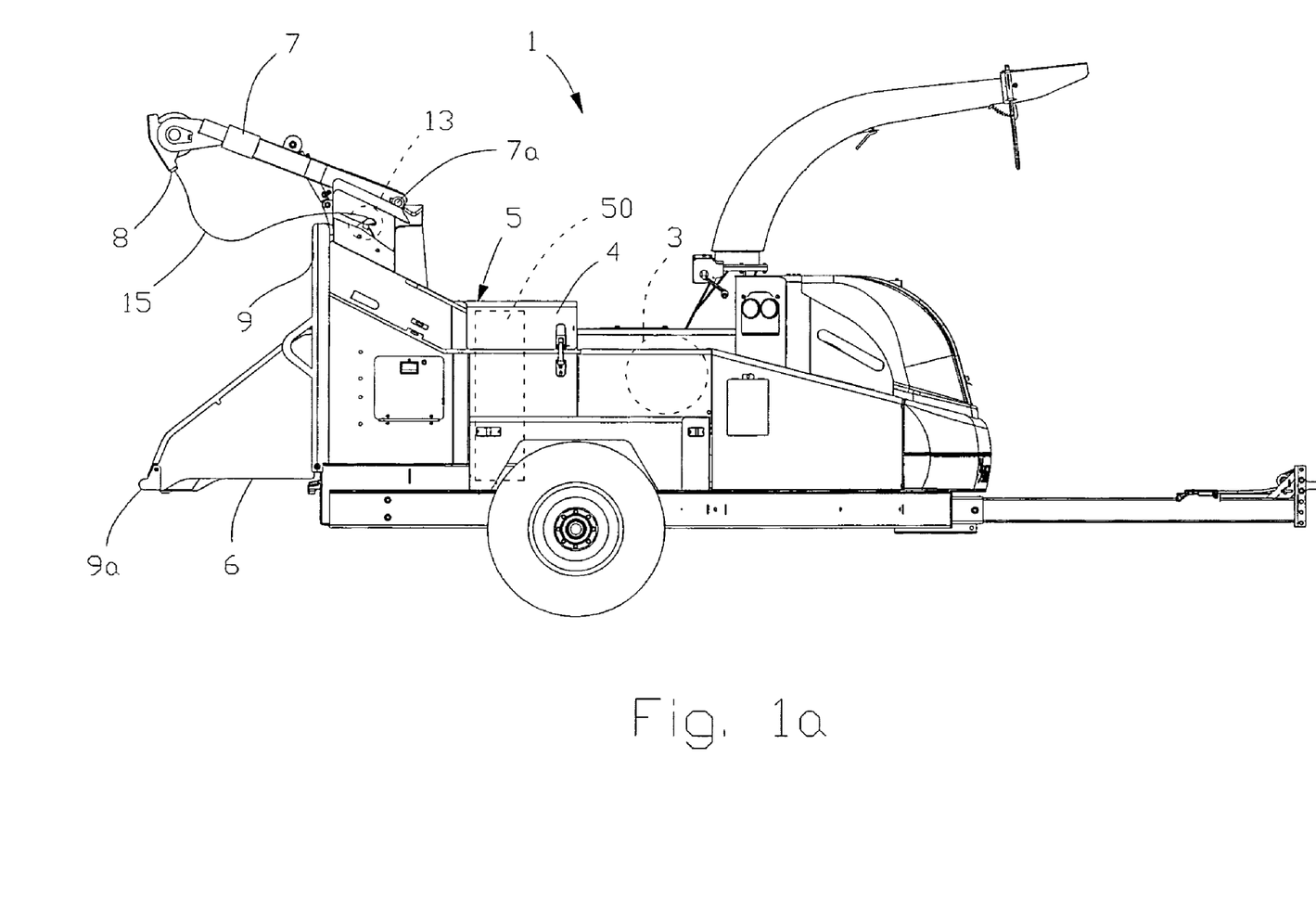
FIG. 1a is a side elevation of the first preferred embodiment demonstrating the pivoting winch boom in the down position, and with the winch line slackened by lowering the boom.
Figure 1B:
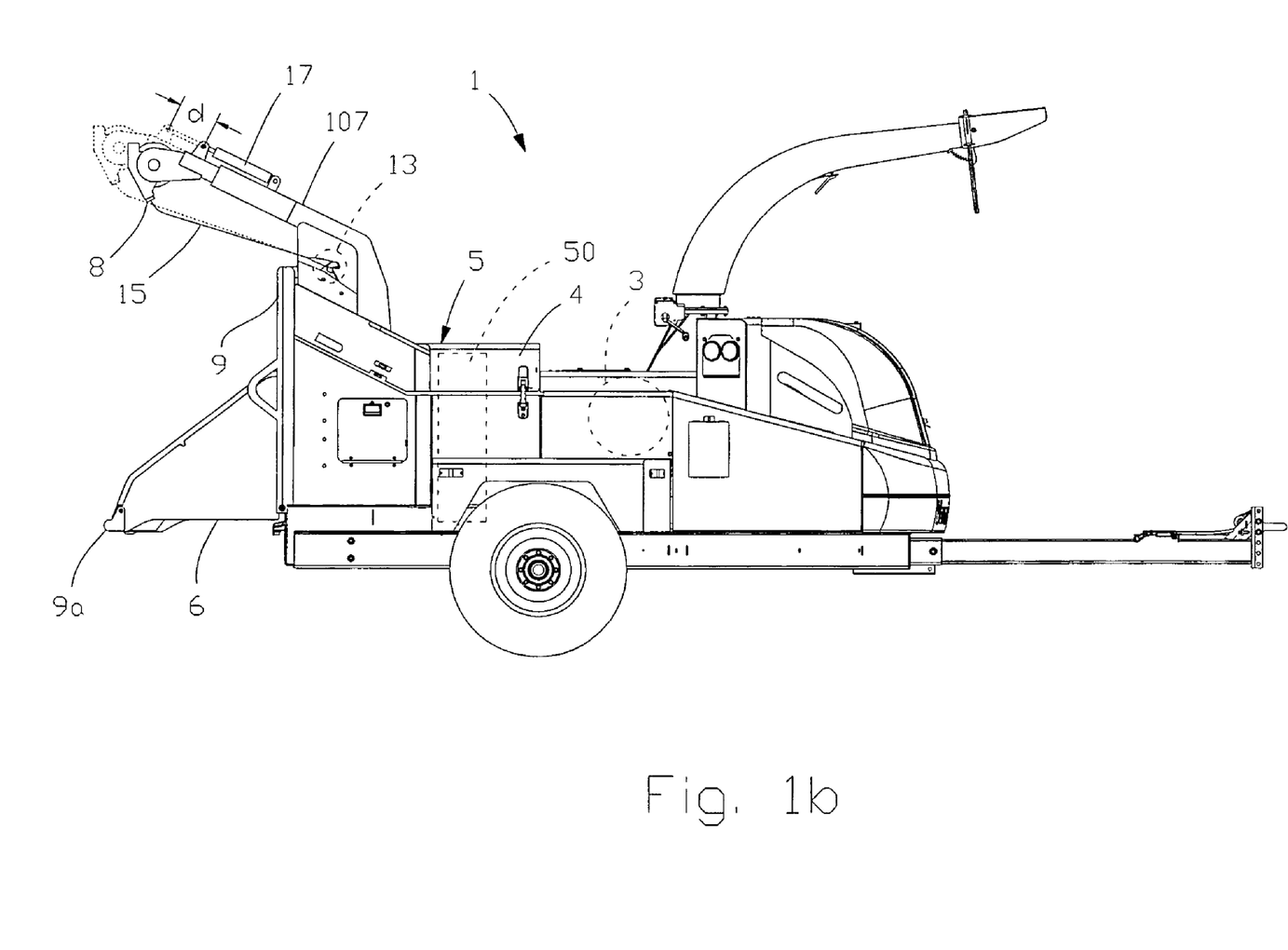
FIG. 1b is a side elevation of a second embodiment in which a cylinder is used to extend an inner tube by a distance d to give the boom a telescoping action, with retracted and extended booms shown superimposed in dashed lines with both in the down position.
Figure 1C:
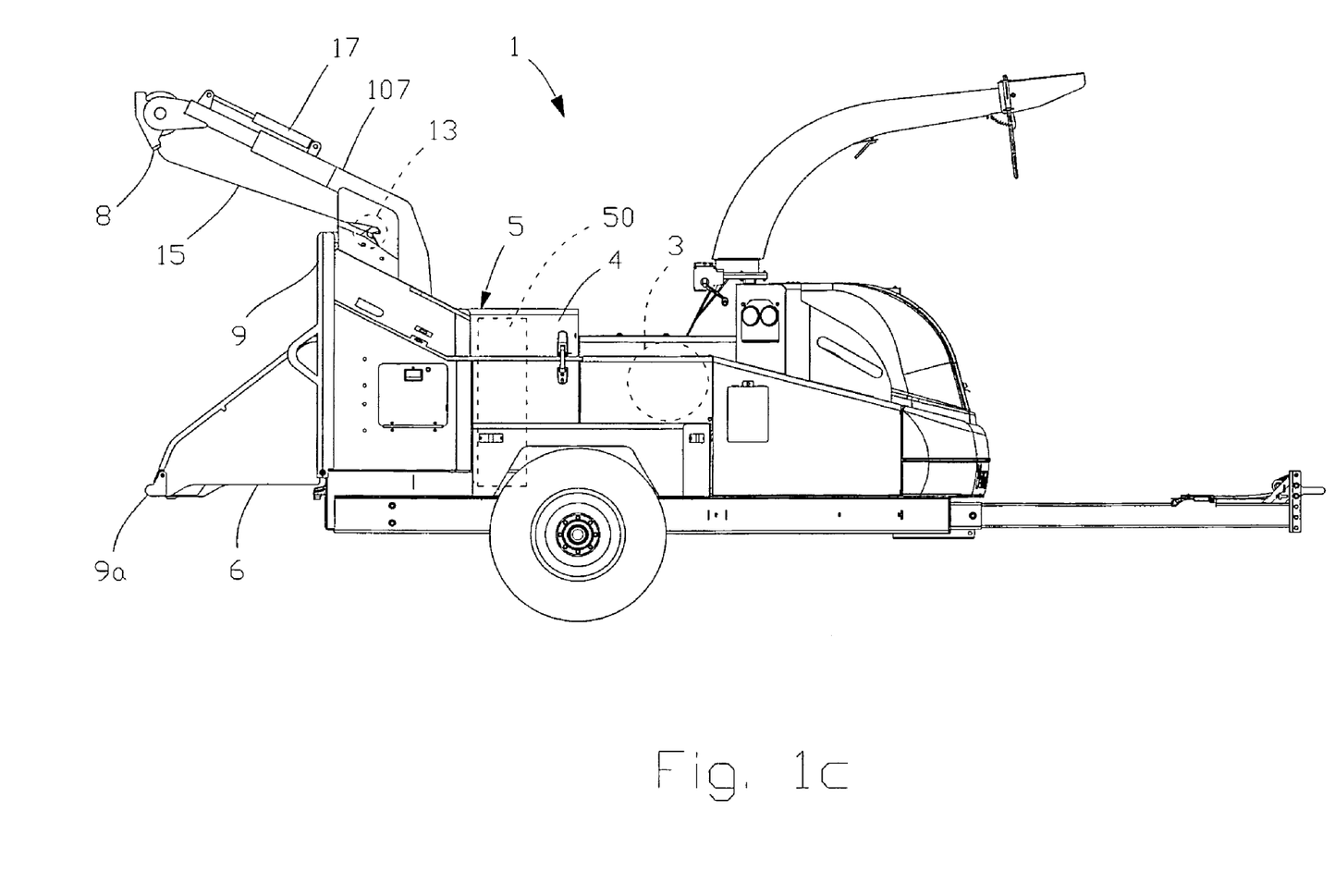
FIG. 1c is a side elevation of the second embodiment shown in FIG. 1b with the boom in the extended position.
Figure 2A:
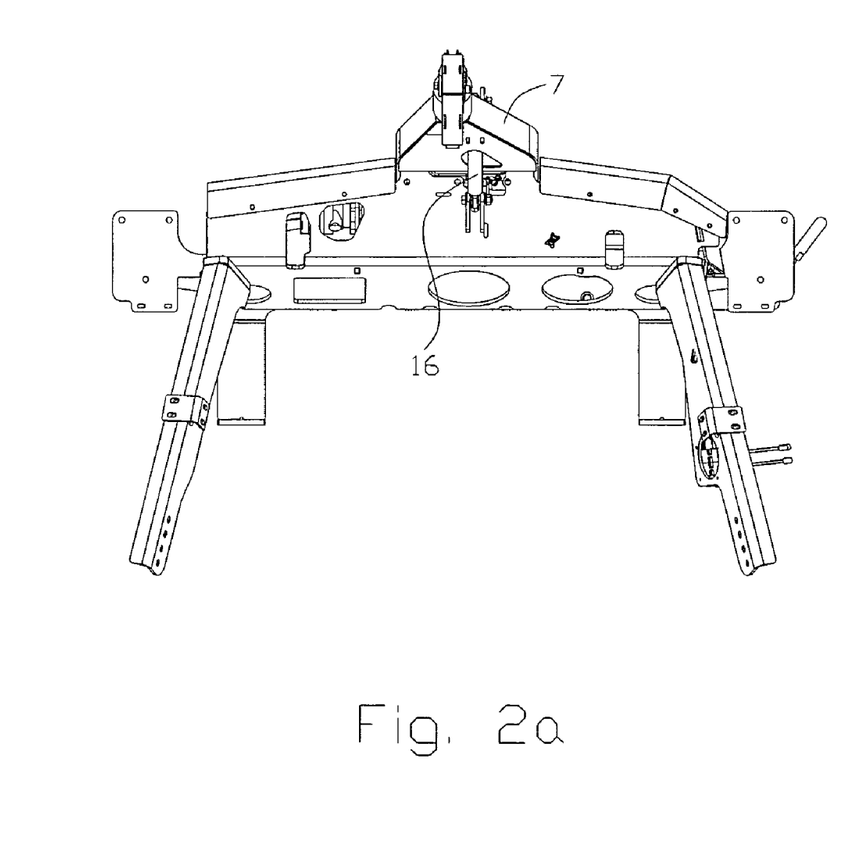
FIGS. 2a and 2b show a front and right-side view respectively of the winch drum assembly of the first preferred embodiment with the boom in the down position.
Figure 2B:
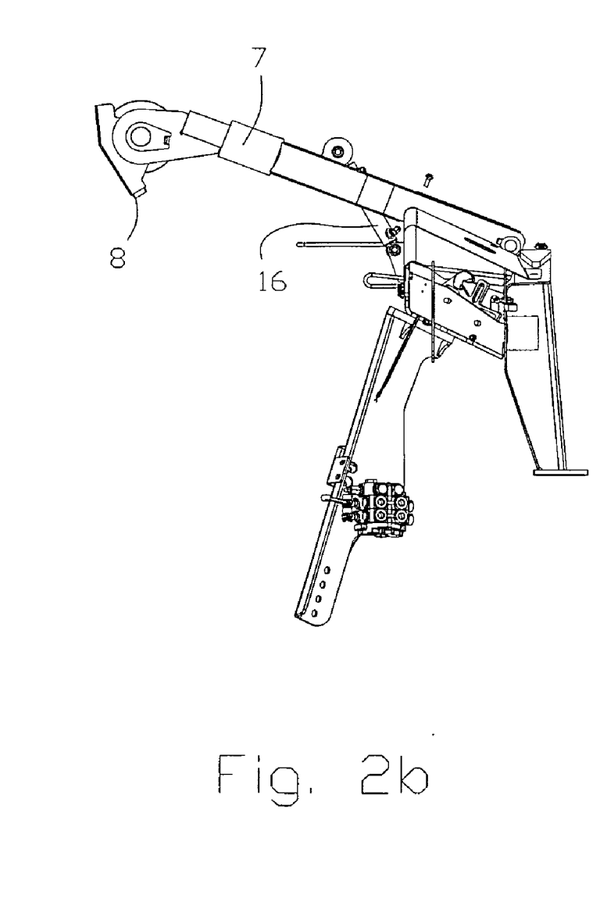
Figure 2C:
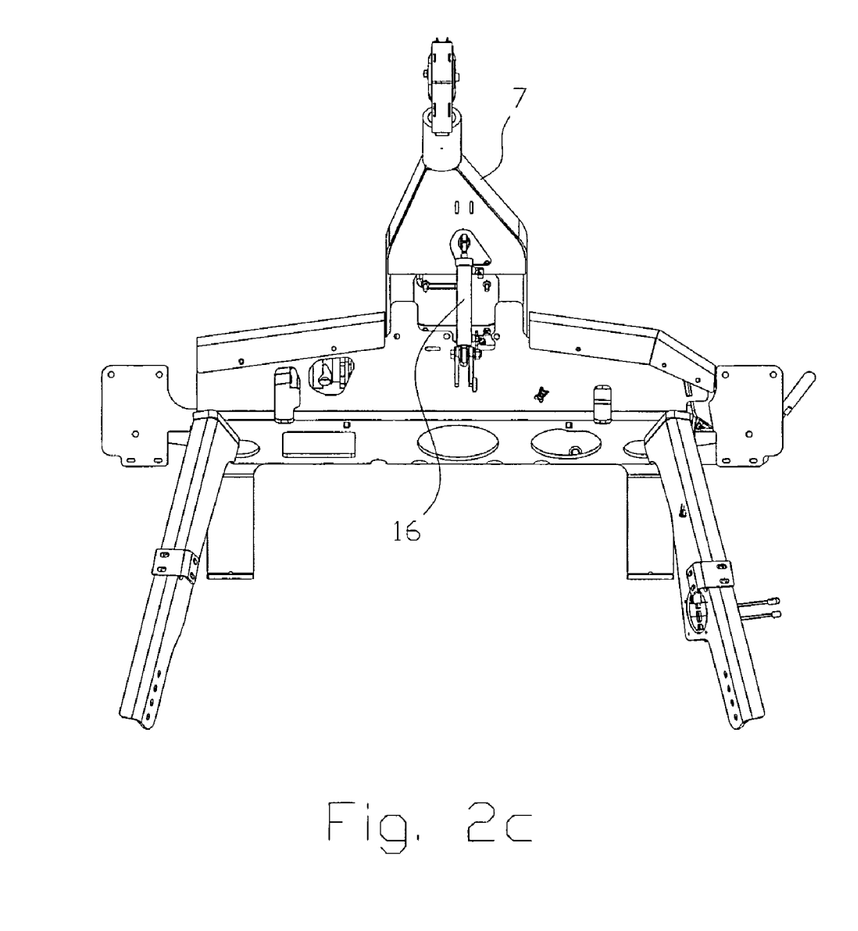
FIGS. 2c and 2d show a front and right-side view respectively of the winch drum assembly as in the first preferred embodiment with the boom in the up position.
Figure 2D:
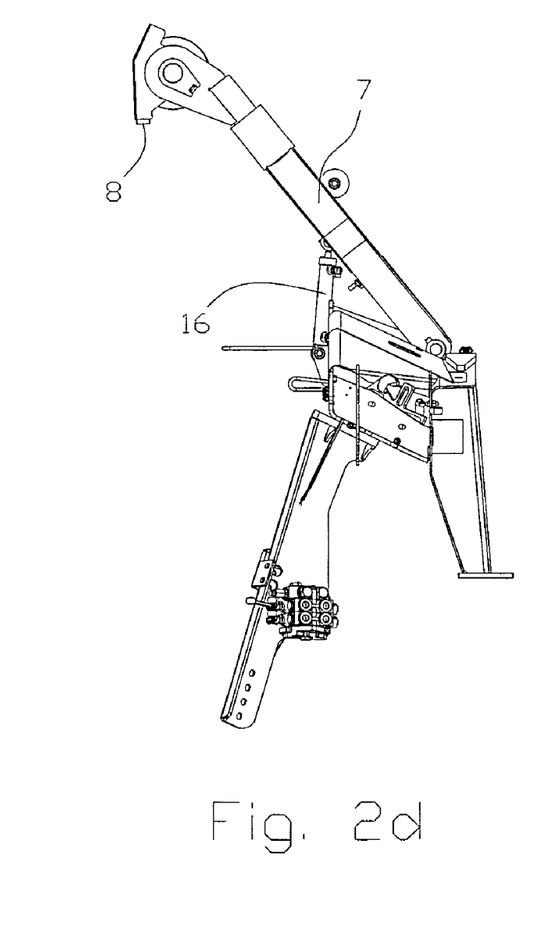

Referring now to the drawings wherein like reference numerals indicate identical or corresponding parts throughout the several views, FIG. 1 shows a brush chipper 1 constructed in accordance with the present invention. This chipper can be constructed generally in accordance with U.S. patent application Ser. No. 11/756,321, which is incorporated herein in its entirety.

FIG. 1 illustrates a wood chipper 1 constructed in accordance with the principles of the present invention. The wood chipper 1 includes a frame (e.g., a trailer structure), a cutter housing supported on the frame with a cutter mechanism 3 positioned within the cutter housing. A feed housing 4 is also supported on the frame. The feed housing encloses a feed mechanism 5 adapted for feeding a log into the cutter mechanism 3. The feed housing 4 is located between the cutter mechanism 3 and a feed table 6 that extends outward from the feed housing 4. The feed table 6 is elevated above ground level and is positioned for supporting the log as the log is fed into the feed mechanism 5. The feed table 6 includes an outer edge located at a position distant or opposite from the feed housing 4.

The wood chipper 1 also includes an elongated boom 7 that is mounted on the feed housing 4 and that extends over the feed table 6. The boom 7 works in combination with a winch 13. The winch boom 7 is pivotally mounted to the frame with a horizontal pivot axis 7a that is located behind the axis of rotation of the winch drum 13. A cylinder 16 is attached to the boom so as to enable the pivoting action. The winch 13 includes a flexible member 15 (e.g., a cable, rope, chain or other type of cable-like structure) that is supported over the feed table 6 by the boom 7. An end guide 8 is positioned adjacent to a free end of the boom 7. The flexible member 15 passes over end guide 8 and separates from the boom 7 at a location directly adjacent to the end guide 8. By connecting the flexible member 15 to the log, the winch 13 can be used to drag the log toward the feed table 6. The end guide 8 is preferably positioned such that when the winch 13 drags the log toward the feed table 6, the boom 7 causes an end of the log to be lifted by the flexible member 15 past the outer edge of the feed table 6 and onto a top surface (e.g., a platform or deck) of the fee table 6.

Figure 3:
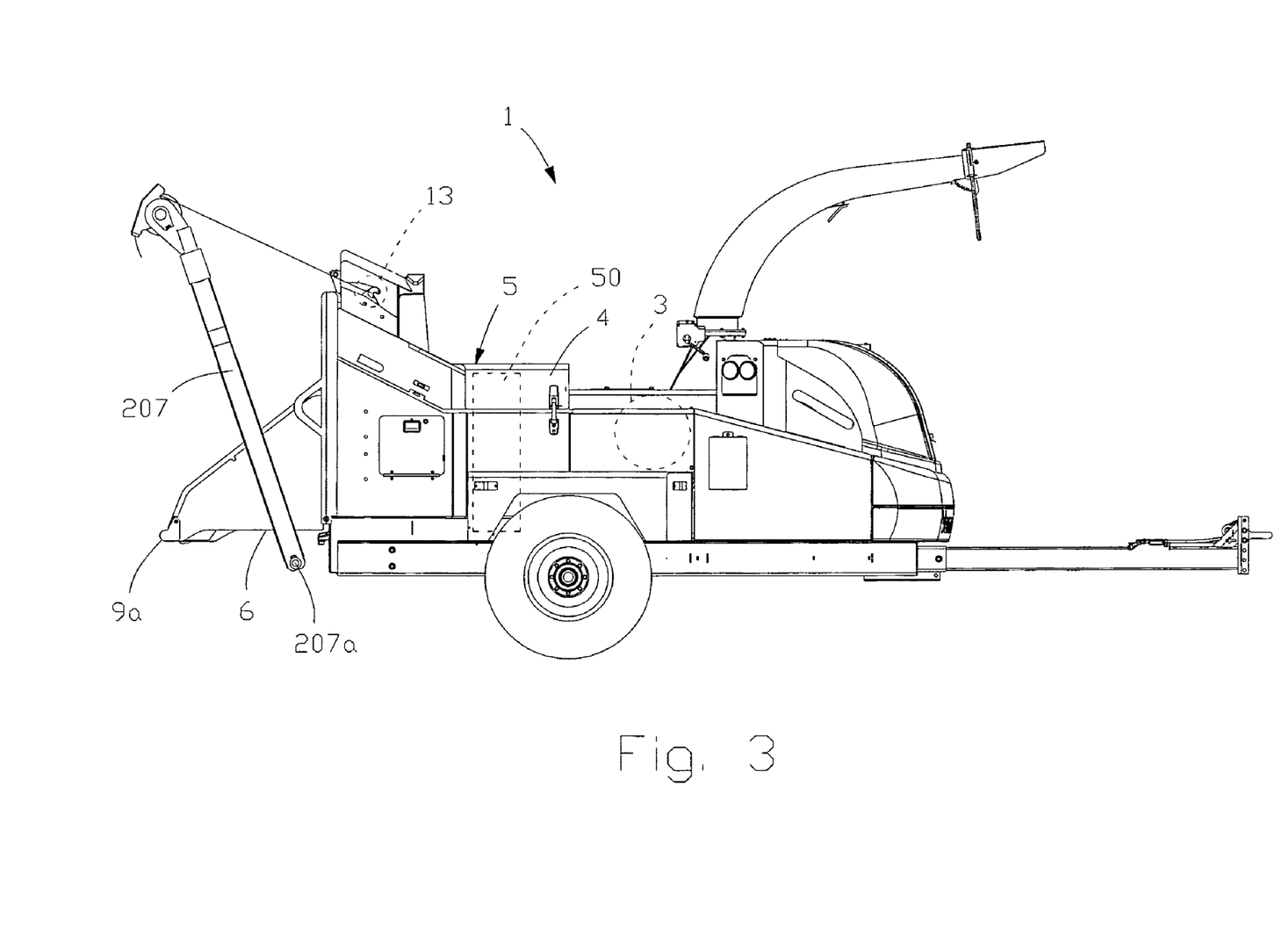
FIG. 3 shows a third embodiment of the pivoting winch boom in which the boom pivot is located in front of the winch and lowered towards the ground.

In an alternative embodiment FIG. 3, the boom pivot would be located in front of the winch 13 and lower to the ground. This arrangement would demonstrate an unexpected benefit by enabling it to reach greater distances thereby allowing the boom to be used to carry the log for a greater distance. Also, the boom would be able to pivot down closer to the log possibly allowing easier choking and may eliminate the occasional inconvenience of re-choking the log during retrieval.

Another embodiment FIG. 1b would consist of an extension tube mounted within the boom 7 and connected to a cylinder 17 which would give the boom a telescoping ability thereby allowing the boom to be used to carry the log for a greater distance.

In FIG. 1, the cutter mechanism 3 is shown as a chipping or cutting drum. However, it will be appreciated that any type of cutting or chipping mechanism (e.g., a disk cutter) could also be used. Also, the feed mechanism 5 shown in FIG. 1 includes two vertical feed rollers 50 (only one shown). However, similar to the cutter mechanism 3, any type of feed mechanism 5 could be used. For example, a single feed roller, horizontal feed rollers, belts, or any other type of conveying mechanism could also be used The feed mechanism 5 is controlled by a control bar 9 located adjacent to he feed table 6.

The feed table 6 is preferably pivotally connected to the feed housing at a horizontal pivot axis. The feed table 6 is typically pivoted up during transport of the wood chipper 1. The top surface of the feed table 6 is adapted for supporting the log as the log is fed into the feed mechanism 5.

Figure 4:
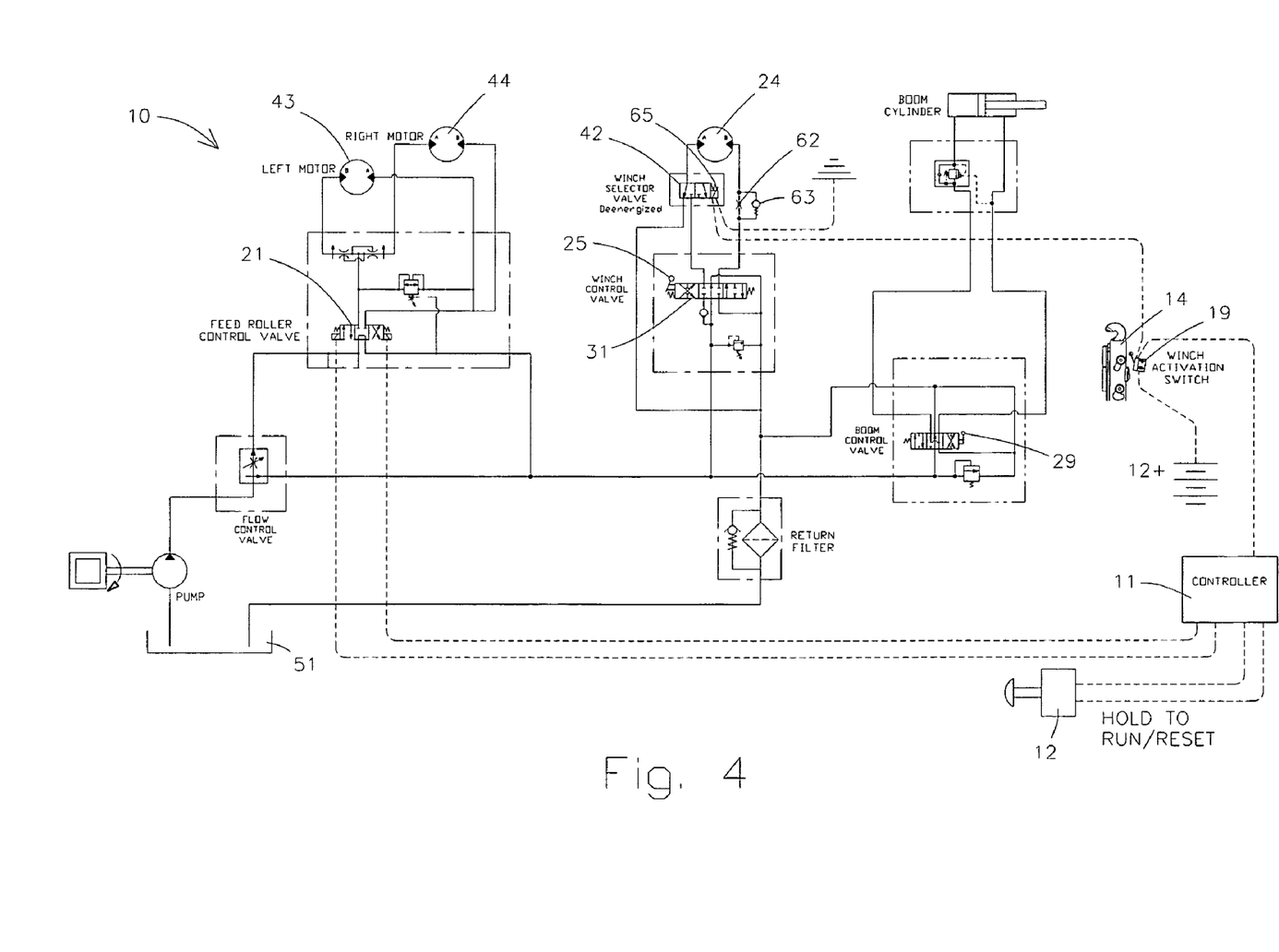
FIG. 4 is a schematic view of a control system and interlock of the present invention.
Figure 5:
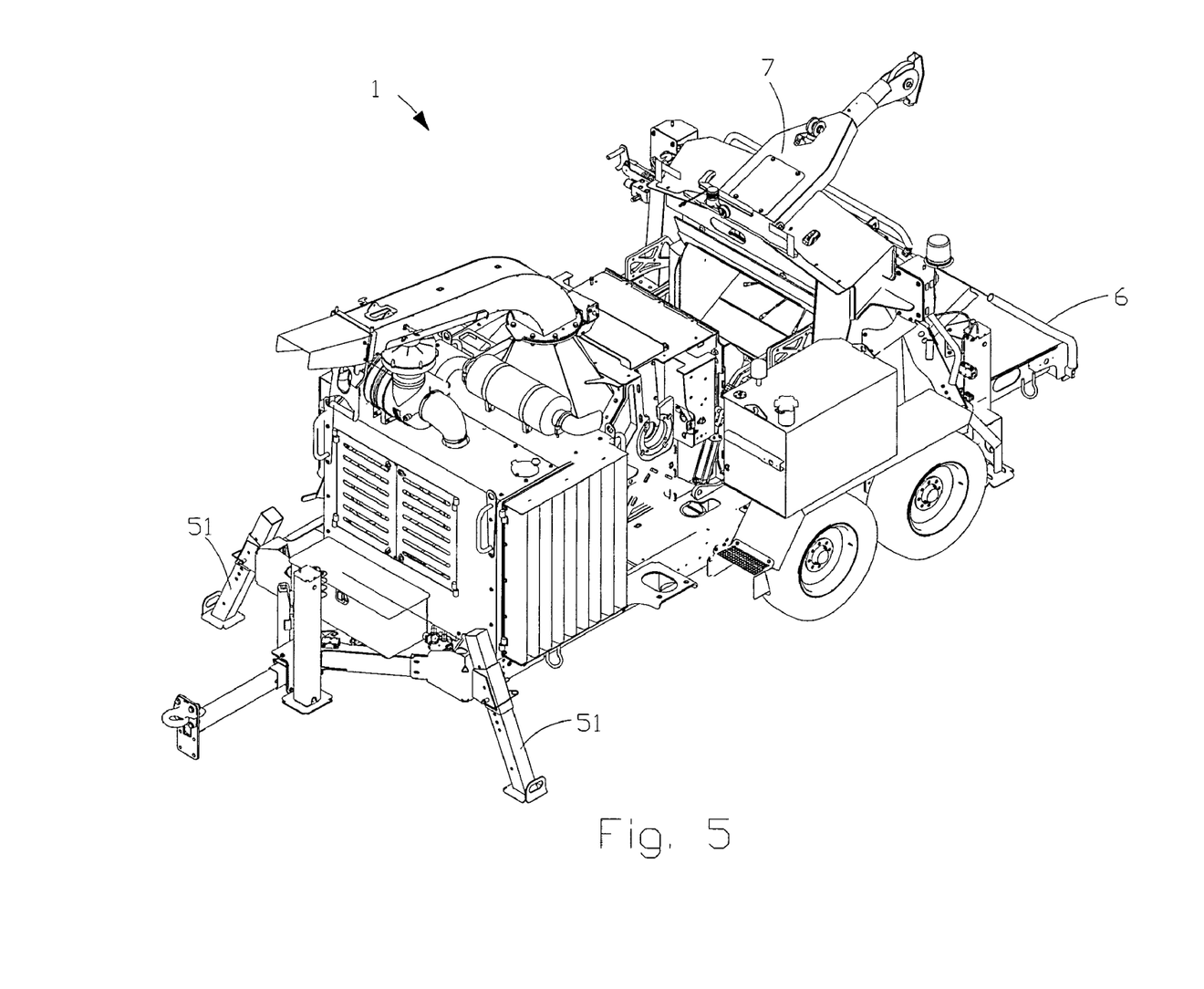
FIG. 5 is an isometric view of the chipper having stabilizer legs extending outward at the front of the machine.
Figure 6:
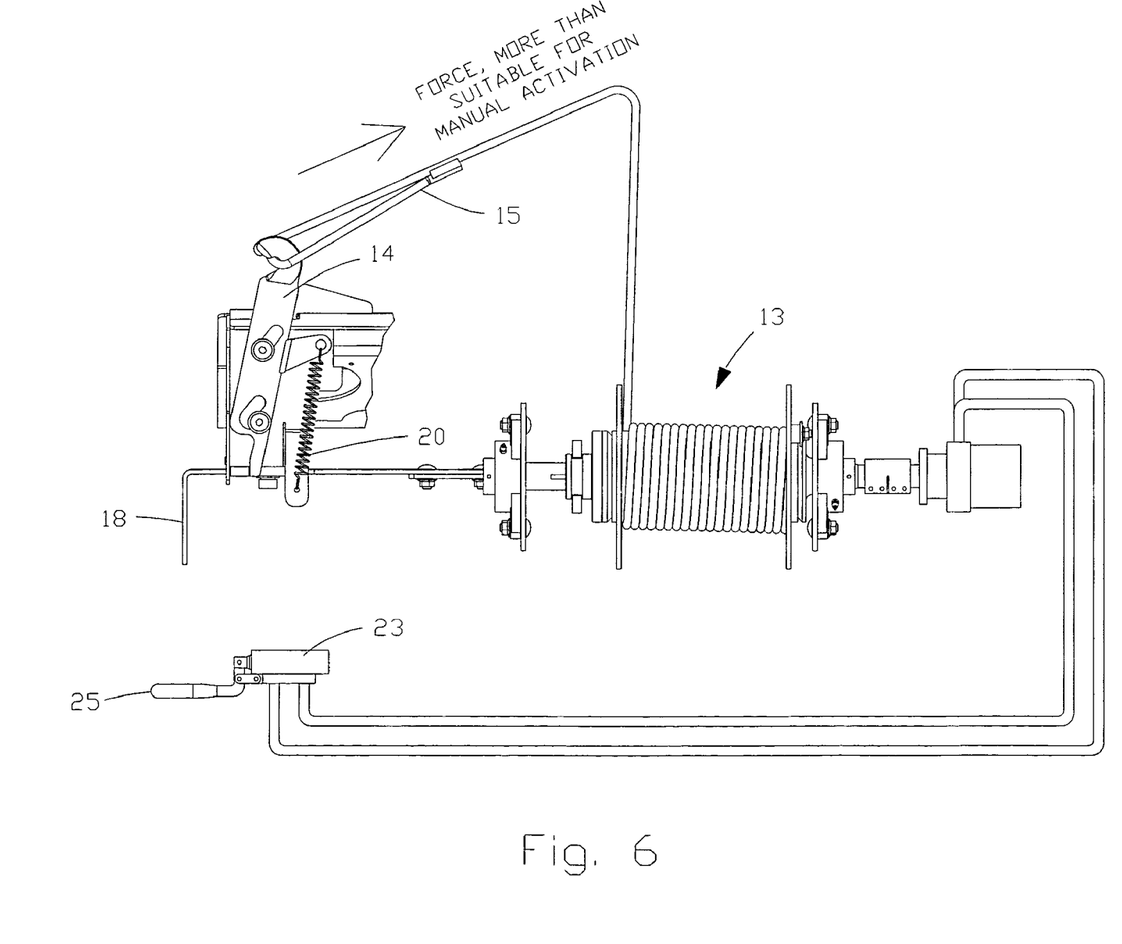
FIG. 6 shows the winch and interlock system in feed mode.
Figure 11:
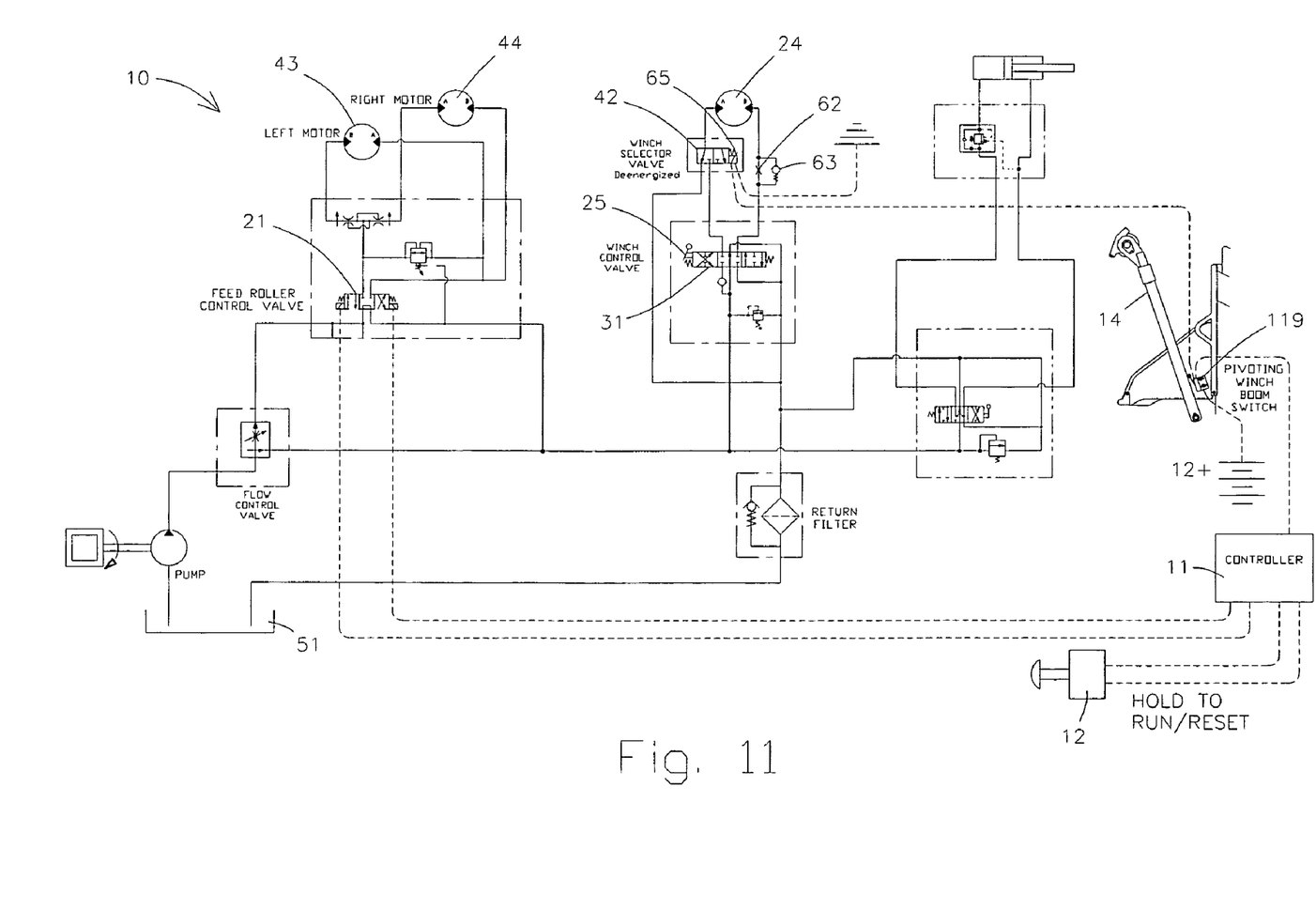
FIG. 11 shows a schematic of the controls for the FIG. 7 embodiment wherein an interlock function operates due to the cooperation of a switch in cooperation with the pivoting of the pivot boom.

Generally, an interlock control system 10 of FIGS. 4 and 11 or 14 of FIG. 6 of the present invention works in the following way: There is an emergency stop that will be called an "e-stop" or "feedstop". This e-stop system, which is built into controller 11 of FIG. 4, is on Vermeer brush chippers, for example as shown in U.S. Pat. No. 7,044,409 to Stelter, et al., so an operator can either activate it by pulling the upper bar or control bar 9 into the most rear position and that activates the e-stop; or the operator pushes a lower bar 9a with his leg for example, a more of a passive control is done which activates the e-stop to stop the feed rollers. These are two ways to activate the e-stop, which stops the feed rollers 50.

In the preferred embodiment, a clutch control system allows the operator to engage or disengage the winch using the winch engage/disengage control lever 18. In the disengaged state, the winch line 15 can be extended by hand. While in the engaged state, the operator can us the winch retract lever 25 (FIG. 4) to either extend or retract the winch line 15.

The preferred embodiment has an interlock control that requires the winch line 15 to be placed on a storage hook 14 before the feed rollers will operate. The interlock control system 10 of FIGS. 11 and 14 of FIG. 6 is described in detail in U.S. patent application Ser. No. 11/756,321, entitled "Coordinated Control of a Winch and a Brush Chipper", which patent application is incorporated herein by reference in its entirety. The storage hook 14 is mechanically connected to a winch activation switch 19 which has the ability to select between feed mode and winch mode as shown in FIG. 4.

For the machine to be in feed mode, it is necessary that the winch line 15 be taut on the interlock hook 14. This design element is in place as a safety feature forcing the operator to place the winch line 15 well out of danger of being grabbed the by feed rollers 50. In feed mode, winch control is disabled and the feed rollers 50 start and stop as determined by the controller 11 to efficiently process the log.

Winch mode can be activated by any usage of the winch engage/disengage lever 18. In winch mode, all operations of the winch 13 are available for use while the feed rollers 50 are disabled.

A single exception is that in winch mode, the hold-to-run/reset button 12 can be depressed for a few seconds to run the feed rollers so as to get a grip on the log. In the winch mode, all operation of the pivoting ability of the boom 7 is also enabled. Thus, winch mode is used during locating and choking of logs to the winch line 15, as well as for the retraction of those logs and any necessary raising and lowering of the log that may be necessary to eventually position the log on the in-feed table 6. Raising and lowering of the winch boom is simply controlled by a boom raise/lower control lever 29 which causes extension and retraction of the boom cylinder 16.

In some applications, use of the pivoting action may not be necessary. Heavy logs, for instance, have a tendency to lift up to the feed table with the boom in the lowered position without assistance from the pivoting action. The boom cylinder 16 has the ability to automatically lower itself for heavy loads by means of a hydraulic valve. Depending on the geometric and mass distribution properties of the particular machine having the present invention, it may be necessary to fix stabilizing arms 51 to the front of the machine to prevent roll of the machine which may be induced by large moments caused by using the present invention to lift heavy logs from the side of the machine. For the machine of type described in FIGS. 1-6, the machine is supported on the ground by a pair of rear wheels and a single hitch point located at the forward extreme. Large tensions in the winch line as the winch line extends at an angle to the longitudinal axis of the machines, may, in this case, cause the machine to roll about an axis substantially the same as a line extending from a rear wheel hub to the hitch point. By locating stabilizer arms 51 at the forward end of the machine, this problem is mitigated as two support points at that end resist the roll-over moment.

A new process has been developed for operating a brush chipper to utilize the unexpected benefits contributed by the pivoting winch boom design.

Preferred Operating Process with Variations of the FIGS. 1-6 Embodiment:

1. Check whether or not the winch line 15 is taut on the interlock control storage hook 14. If it is slack, remove it from the interlock and proceed to step 3. If taut, proceed to step 2. Variation: If the boom is not at its extreme lowered position initially, the boom may be lowered slightly using the raise/lower control lever 29 to slacken the line.

2. Move the winch engage/disengage lever 18 to disengage. Tug on the line 15 by hand to remove the line from the interlock 14.

3. Move the winch engage/disengage lever 18 to disengage which automatically moves the interlock control 14 to the winch mode position. (In winch mode, the feed rollers 50 are disabled except if the hold-to-run button 12 is held down to grip the log.)

4. Pull the winch line 15 out and connect to the log.

5. Moved the winch engage/disengage control 18 to engaged and then pull the log to the chipper using the winch 13 by moving the winch retract lever 25 (FIG. 4) to retract. If the log is small and requires lifting to the feed table 6, use the boom control lever 29 to lift it to the feed table 6. Variation: The boom 7 may be controlled to any available height within this step. For instance, the boom could begin in the up position if the location of the log required it. Another variation: A heavy log may not require lifting the boom. Still another variation: The telescoping action would be available at any time within this step.

6. Press and hold the green hold-to-run button 12 only until the feed rollers 50 grasp and hold the log. Variation: This may not be deemed to be required.

7. Release the log from the winch line 15 and connect the line to the interlock control storage hook 14.

8. Remove choker chain from log.

9. Use the winch retract control lever 25 (FIG. 4) to pull on the interlock control 14 until it lock into the feed control position. The machine is now in feed control mode causing the winch 13 to automatically cease retracting. Variation: If the boom 7 is in a lowered position, lifting the boom may be used to pull the interlock control 14 so as to enable the feed control mode.

10. Operation of the chipper may continue as use in feed control mode. Pressing the green hold-to-run/reset button 12 will start the feed rollers. The chipper 1 will now start and stop the rollers 50 automatically to effectively process the log.

11. The process may be recycled beginning with step 1.

Referring now to FIGS. 7-10 it is noted that the interlock control has been eliminated. A block 201 is attached to the line 15 leaving only enough of the line 15*a* extending from the end guide 208 to make sure that the portion 15*a* will not extend into the feed rollers 50. It does not require an interlocking control that is described above with respect to FIGS. 1-6. In this embodiment of FIGS. 7-10 the interlocking function is very simple and is illustrated in FIG. 11. When the winch arm 207 is raised until it hits the switch 119, the feed rollers 50 are allowed to operate, when the winch arm 207 is lowered, the switch 119, in conjunction with the controller 11, causes the feed rollers 50 to be locked from rotation. This embodiment of FIGS. 7-11 does not eliminate the interlock function, but does eliminate the interlock control, the hook 14 of FIG. 6.

Figure 7:
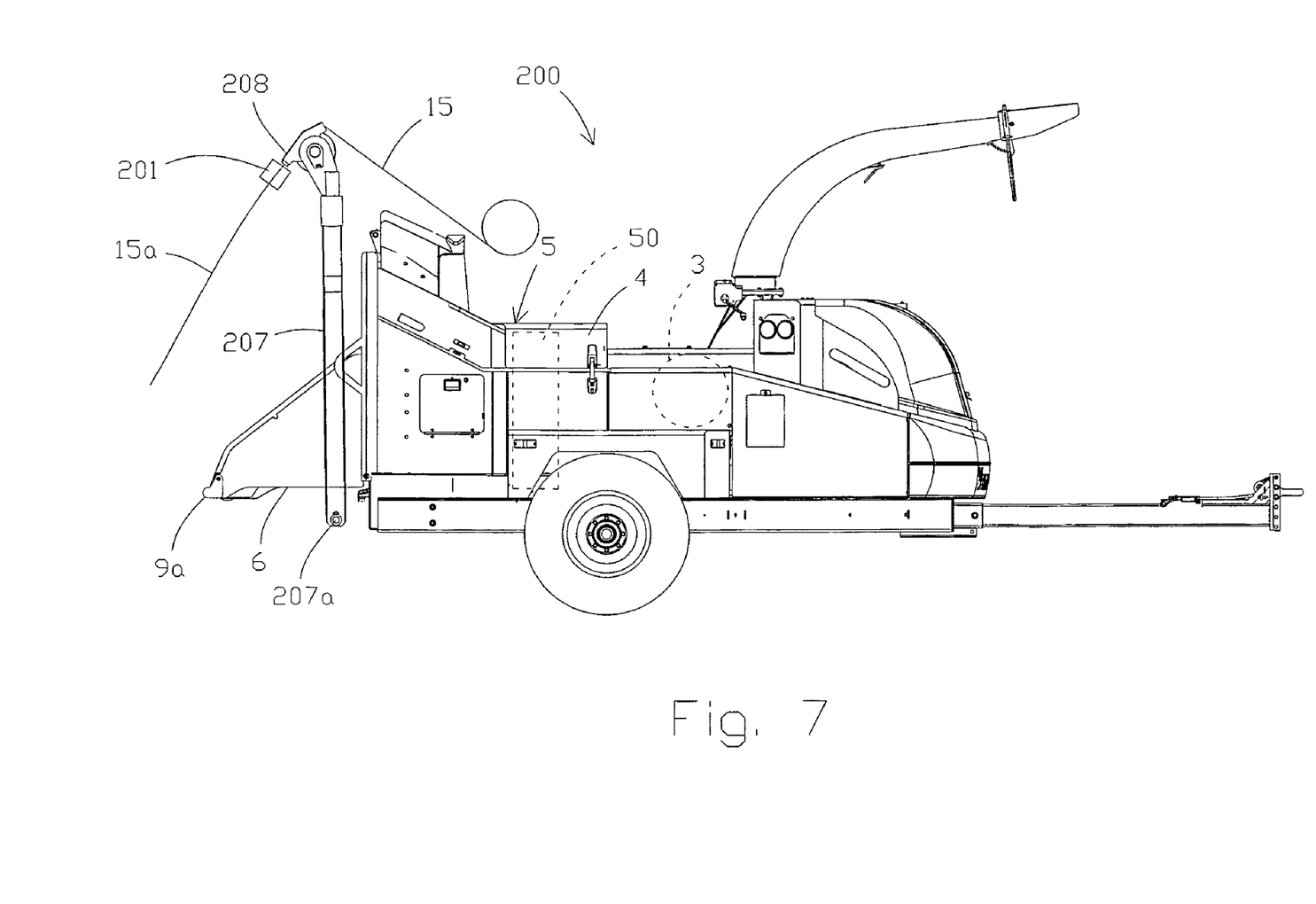
FIG. 7 shows a side view of a fourth embodiment which is very similar to the third embodiment of FIG. 3 in which the boom pivot is located in front of the winch and lowered towards the ground and which does not need to be associated with an interlock control.

Referring to FIG. 7, when the arm 207 is pulled back to the FIG. 7 position, the feed rollers 50 can operate. The length of the winch line 15*a* beyond the block 201 is limited so that it will not get caught in the feed rollers 50.

Figure 8:
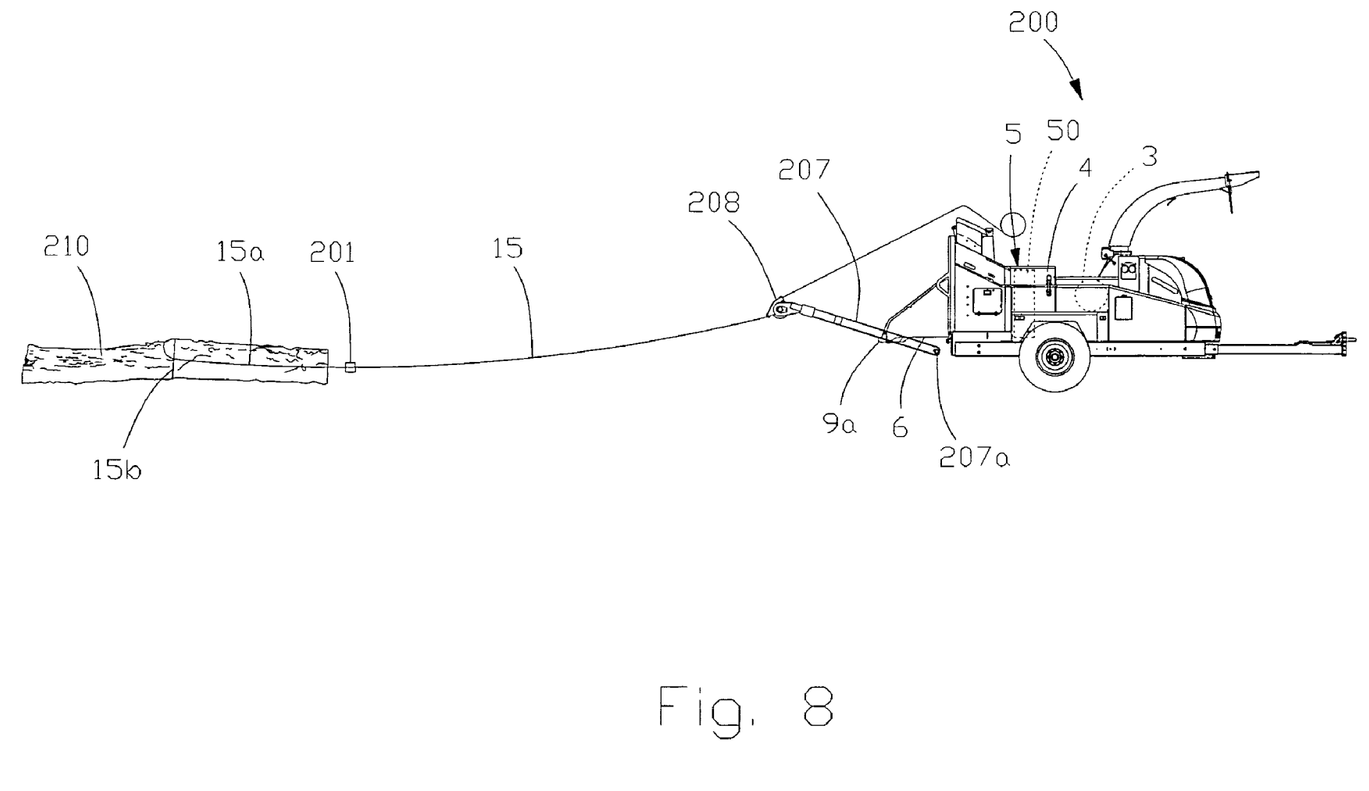
FIG. 8 shows a side view of the fourth embodiment of FIG. 7 in use in preparation for pulling a log into the brush chipper.

FIG. 8 shows a choker 15*b*, connected to the line 15*a*, connected 40 to 50 inches back on the log 210. With the arm 207 lowered, the feed rollers 50 are disabled so that the winch line 15 can be pulled out and hooked to the log 210.

Figure 9:
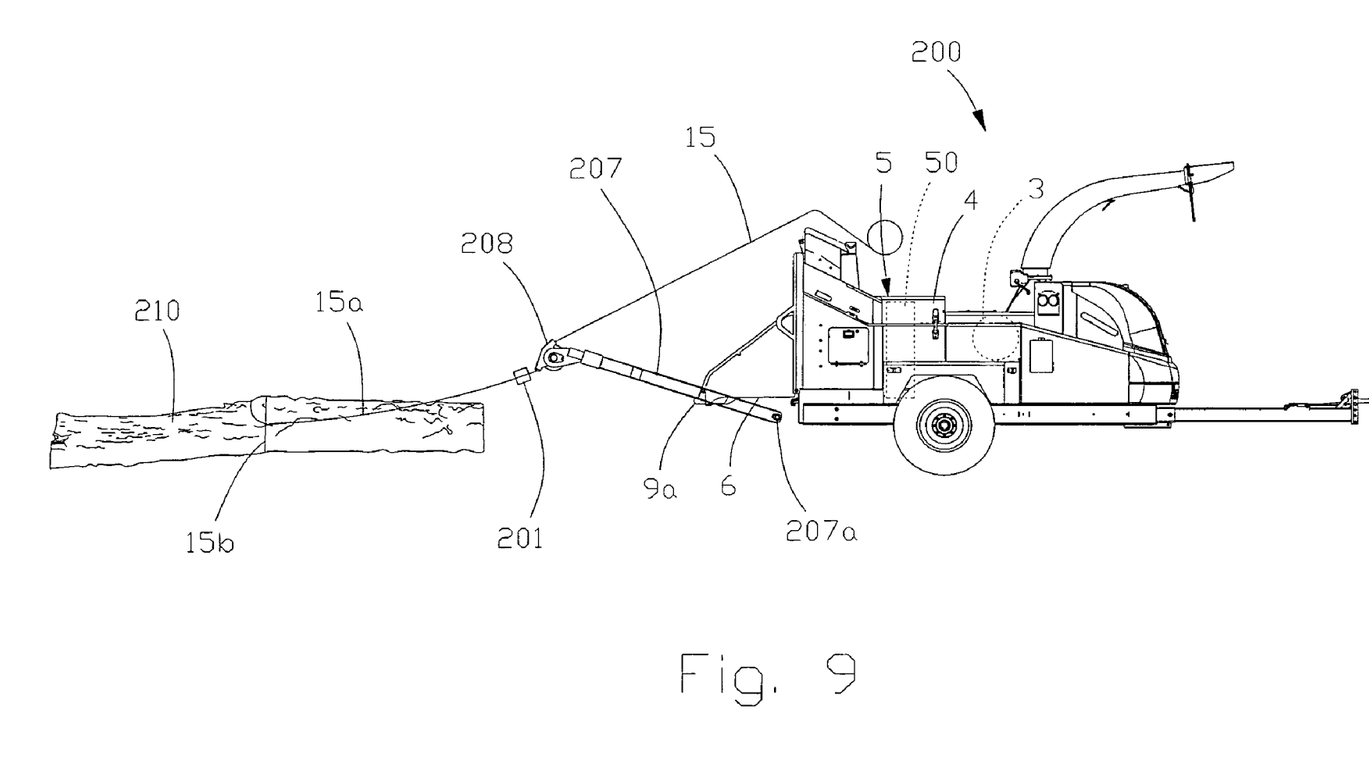
FIG. 9 shows a side view of the fourth embodiment of FIG. 7 in use showing the log pulled closer to the brush chipper from the FIG. 8 hook up situation.

FIG. 9 shows the winch line 15 retracted. Once the block 15*a* hits the end guide 208, retraction of the winch line 15 also lifts the log 210.

Figure 10:
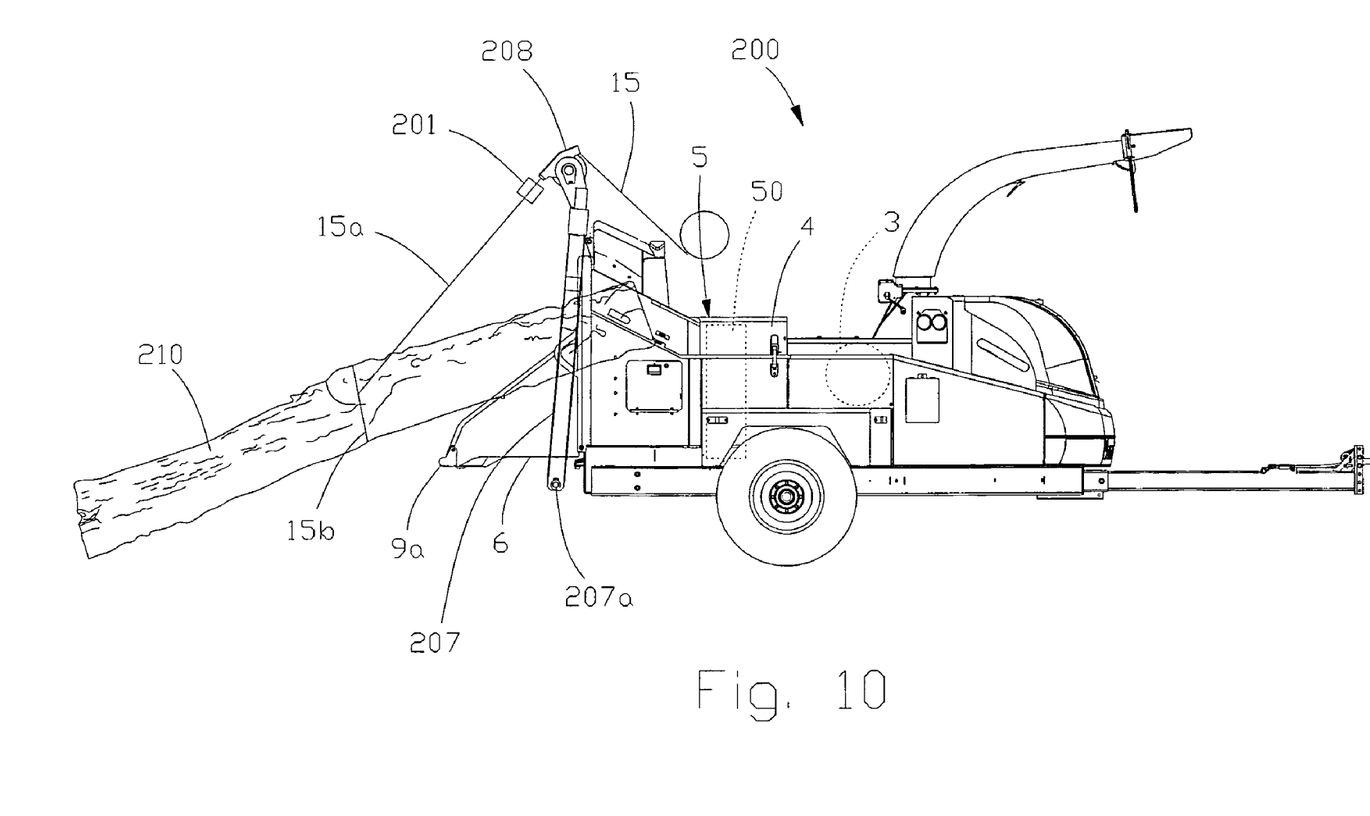
FIG. 10 shows a side view of the fourth embodiment of FIG. 7 in use showing the log pulled onto the feed table of the brush chipper from the FIG. 9 position thereof.

Looking now to FIG. 10, when the arm 207 gets to its raised position, the feed rollers 50 can be operated to pull the log 210 onto the feed table 6 and can be stopped after being pulled in a short distance, after which the choker 15*b* is removed. Then the hold to run button can be used to grab the log 210. Then the chipping of the log 210 can be done in a normal fashion.

It is noted that the winch line 15 of the new alternate embodiment of FIGS. 7-10 can be made of two parts, the first part extending from the winch drum 13 to the block 201, and the second part 15*a* from the block 201 to the end made to attach to a choker 15*b*. The first part could be made of one material like wire rope or fiber rope, and the second part 15*a* of a different material, preferably fiber rope because it is easier to work with.

Accordingly, it will be appreciated that the preferred embodiments herein do indeed accomplish the aforementioned objects. Obviously many modifications and variations of the present invention are possible in light of the above teachings. It is therefore to be understood that, within the scope of the appended claims, the invention may be practiced otherwise than as specifically described.

The invention claimed is:

1. A brush chipper comprising:
   a frame;
   a material reducing drum operatively attached to the frame;
   at least one feed roller operatively attached to the frame for feeding brush into the material reducing drum;
   an in-feed table operatively attached to the frame for supporting brush before it reaches the feed roller;
   a winch drum operatively attached to the frame;
   a winch line operatively attached to the winch drum;
   a winch line boom for guiding the winch line from the winch drum, the winch boom having a first end thereof operatively pivotally attached adjacent one end thereof to the frame and a second end;
   a winch line guide operatively attached to the winch line boom adjacent the second end thereof and wherein the winch line extends from the winch drum to the winch line guide; and
   wherein the winch line guide has at least a first position with respect to the frame and a second position with respect to the frame, the second position being spaced from the first position.

2. The brush chipper of claim 1 wherein the boom is operatively attached to the frame about a pivotal axis and the first and second positions are located in an arc disposed about the pivotal axis.

3. The brush chipper of claim 2 wherein the winch line guide is operatively reciprocally attached to the winch line boom whereby the winch line guide is adjustably movable closer to or farther from the pivotal axis.

4. The brush chipper of claim 1 wherein the first and second positions are disposed along a straight line.

5. The brush chipper of claim 4 wherein the boom is operatively attached to the frame about a pivotal axis.

6. The brush chipper of claim 5 wherein the boom wherein the winch line guide is operatively reciprocally attached to the winch line boom whereby the winch line guide is adjustably movable closer to or farther from the pivotal axis.

7. The brush chipper of claim 1 including stabilizer arms operatively attached to the frame for selectively engaging the ground to prevent tipping of the frame during use of the winch line.

8. The brush chipper of claim 7 including an extension tube operatively telescopically attached within the boom to the frame and having a hydraulic cylinder disposed therein for permitting a greater reach distance of the winch line boom, thereby allowing more log approaching options.

9. A brush chipper with a frame supporting a material reducing drum, at least one feed roller in front of the drum, and an in-feed table that is positioned a distance off the ground and in front of the feed rollers, the improvement comprising:
a winch drum with an axis of rotation that is operatively mounted to the frame and positioned above the at least one feed roller;
a winch line boom that supports a winch line guide and extends above the in-feed table;
wherein the winch line boom is pivotally mounted to the frame with a horizontal pivot axis that is located behind the axis of rotation of the winch drum; and
stabilizing arms fixed to the front end of the machine.

10. The brush chipper of claim 9 wherein the pivotal axis is disposed behind the winch drum and closer to the ground than the winch drum thereby enabling the winch line boom to extend to greater distances whereby the winch line boom can be used to carry a log for a greater distance without re-choking the log because the winch line boom would be able to pivot down closer to the log during retrieval.

11. An improvement to a brush chipper with a material reducing drum, at least one feed roller in front of the drum, an in-feed table that is positioned a distance off the ground and in front of the feed rollers, a winch line drum having a winch line thereon supported by a pivoting boom, and an interlock control that requires the winch line to be placed on a storage hook before the at least one feed roller will operate, the improvement comprising the winch line boom being operatively pivotally mounted to the frame.

12. A method of using a brush chipper with a material reducing drum, at least one feed roller in front of the drum, an in-feed table that is positioned a distance off the ground and in front of the feed rollers, a winch line drum having a winch line thereon supported by a pivoting boom, an interlock control that requires the winch line to be placed on a storage hook before the at least one feed roller will operate wherein the winch line boom is operatively pivotally mounted to the frame, said method comprising activating or deactivating the interlock control by loosening or tightening the winch line by pivoting the pivoting boom or rotating the winch line drum.

13. An improvement to a brush chipper with a material reducing drum, at least one feed roller in front of the drum, an in-feed table that is positioned a distance off the ground and in front of the feed rollers, a winch line drum having a winch line thereon supported by a pivoting boom, the pivoting boom being also telescopically disposed for selectively adjusting the length thereof, and an interlock control that requires the winch line to be placed on a storage hook before the at least one feed roller will operate, the improvement comprising the winch line boom being operatively pivotally mounted to the frame.

14. A method of using a brush chipper with a material reducing drum, at least one feed roller in front of the drum, an in-feed table that is positioned a distance off the ground and in front of the feed rollers, a winch line drum having a winch line thereon supported by a pivoting boom, the pivoting boom being also telescopically disposed for selectively adjusting the length thereof, an interlock control that requires the winch line to be placed on a storage hook before the at least one feed roller will operate, wherein the winch line boom is operatively pivotally mounted to the frame, the method comprising the interlock control system being activated or deactivated by loosening or tightening the winch line by pivoting the pivoting boom, rotating the winch line drum or changing the length of the boom or by any combination of said pivoting the pivoting boom, rotating the winch line drum or changing the length of the pivoting boom.

15. A brush chipper comprising:
a frame;
a material reducing drum operatively attached to the frame;
at least one feed roller operatively attached to the frame for feeding brush into the material reducing drum;
an in-feed table operatively attached to the frame for supporting brush before it reaches the feed roller;
a winch drum operatively attached to the frame;
a winch line operatively attached to the winch drum;
a winch line boom operatively pivotally attached to the frame for guiding the winch line from the winch drum, the winch boom having a first end thereof operatively pivotally attached adjacent one end thereof to the frame and a second end, the boom having a raised, mostly vertical, position and a lowered, mostly horizontal position;
a winch line guide operatively attached to the winch line boom adjacent the second end thereof and wherein the winch line extends from the winch drum to the winch line guide; and
a block operatively attached to the winch line which is large enough that it will not pass through the winch line guide.

16. The brush chipper of claim 15 wherein there is a predetermined distance between the winch line guide and the at least one feed roller and the length of the winch line is less than said predetermined distance so that the winch line will not be grasped by the at least one feed roller.

17. The brush chipper of claim 15 including a control on the brush chipper that prevents the at least one feed roller from operating when the winch line boom is not in the raised position thereof and permits the at least one feed roller to operate when the winch line boom is in the raised position thereof.

18. The brush chipper of claim 17 wherein the control includes a switch that is on or off depending upon the pivotal position of the winch line boom.

19. A method of using the brush chipper of a type comprising:
a frame;
a material reducing drum operatively attached to the frame;
at least one feed roller operatively attached to the frame for feeding brush into the material reducing drum;
an in-feed table operatively attached to the frame for supporting brush before it reaches the feed roller;
a winch drum operatively attached to the frame;

a winch line operatively attached to the winch drum;

a winch line boom operatively pivotally attached to the frame for guiding the winch line from the winch drum, the winch boom having a first end thereof operatively pivotally attached adjacent one end thereof to the frame and a second end, the boom having a raised, mostly vertical, position and a lowered, mostly horizontal position;

a winch line guide operatively attached to the winch line boom adjacent the second end thereof and wherein the winch line extends from the winch drum to the winch line guide; and a block operatively attached to the winch line which is large enough that it will not pass through the winch line guide, said method comprising;

lowering the winch line boom to the lowered position thereof while at the same time disabling the at least one feed roller;

connecting the winch line to a log;

retracting the winch line until the block hits the winch line guide; and pivoting the winch line boom to the raised position thereof to pull the log onto the feed table.

20. The method of claim 19 including activating the at least one roller to pull the log into contact with the material reducing drum and operating the material reducing drum to reduce the log to smaller pieces and using the at least one feed roller to advance the log into the material reducing drum until the entire log has been reduced to such smaller pieces.

* * * * *